United States Patent
Anderson, Jr.

[11] 3,913,606
[45] Oct. 21, 1975

[54] FLUID MEASURING CIRCUIT

[76] Inventor: David L. Anderson, Jr., 2930 19th St., Bakersfield, Calif. 93305

[22] Filed: Jan. 2, 1974

[21] Appl. No.: 430,072

[52] U.S. Cl. ............... 137/205; 137/563; 137/565
[51] Int. Cl.² ......................................... F04F 3/00
[58] Field of Search .......... 137/205, 563, 565, 571, 137/609, 612.1, 627.5, 628; 222/133, 145

[56] References Cited
UNITED STATES PATENTS

| | | | |
|---|---|---|---|
| 2,218,393 | 10/1940 | Corydon | 137/209 X |
| 2,714,393 | 8/1955 | Hollinger | 137/563 |
| 2,893,412 | 7/1959 | Fox et al. | 137/3 |
| 3,706,319 | 12/1972 | Neese et al. | 137/205 |
| 3,750,692 | 8/1973 | Tibbs | 137/205 |

*Primary Examiner*—Alan Cohan
*Assistant Examiner*—Gerald A. Michalsky

[57] ABSTRACT

A fluid measuring circuit for introducing into a mixing system a measured quantity of a selected toxic material. The measuring circuit is characterized by a holding tank for toxic liquid, a conduit coupling the holding tank in communication with a circulating pump connected within a liquid transfer circuit, and a tubular member having one end connected with the holding tank while the opposite end portion thereof is adapted to be inserted through a substantially sealed opening provided in a point-of-sale container, and a three-way selector valve interposed between the pump and the holding tank having a first position wherein a negative pressure is introduced into the holding tank, a second position wherein the negative pressure is relieved, and a third position wherein the toxic liquid is delivered to the transfer circuit via the conduit.

1 Claim, 9 Drawing Figures

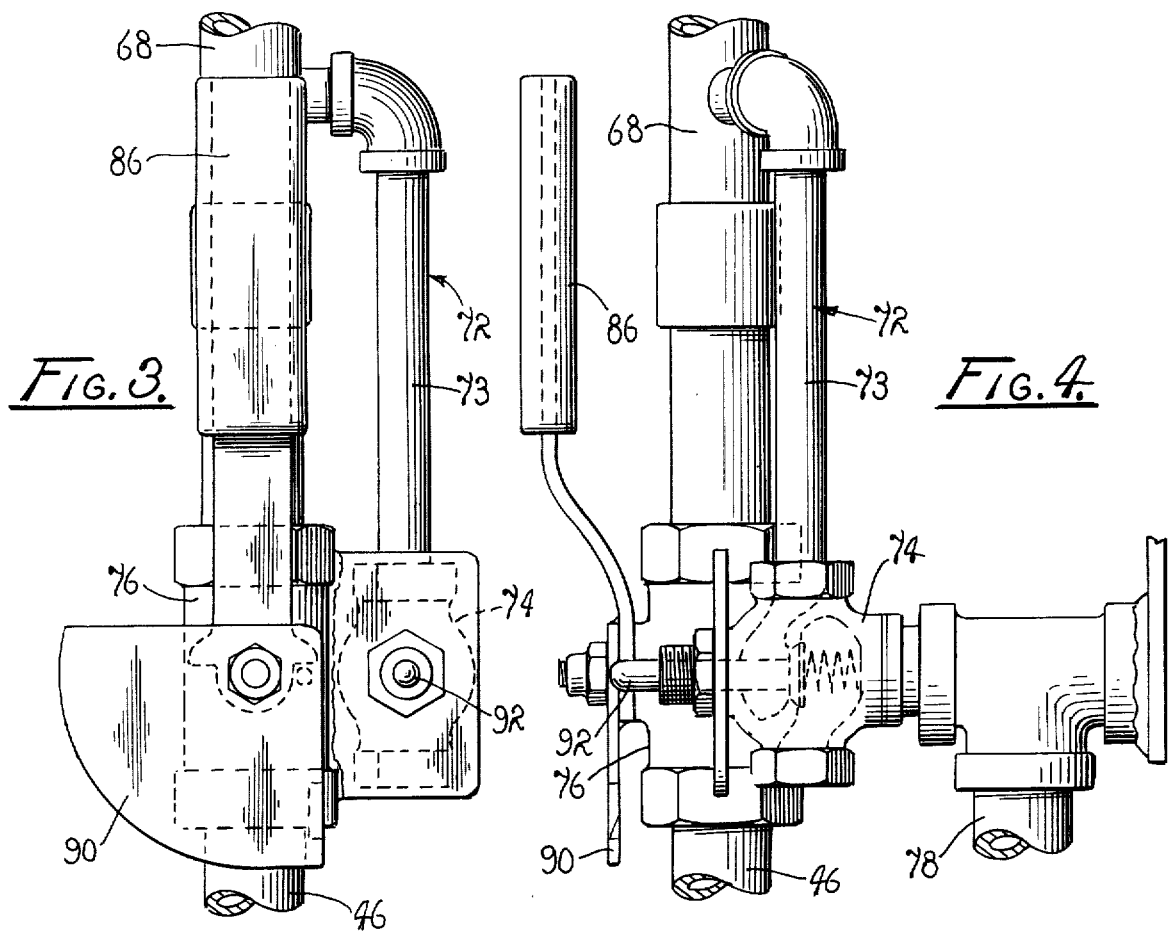
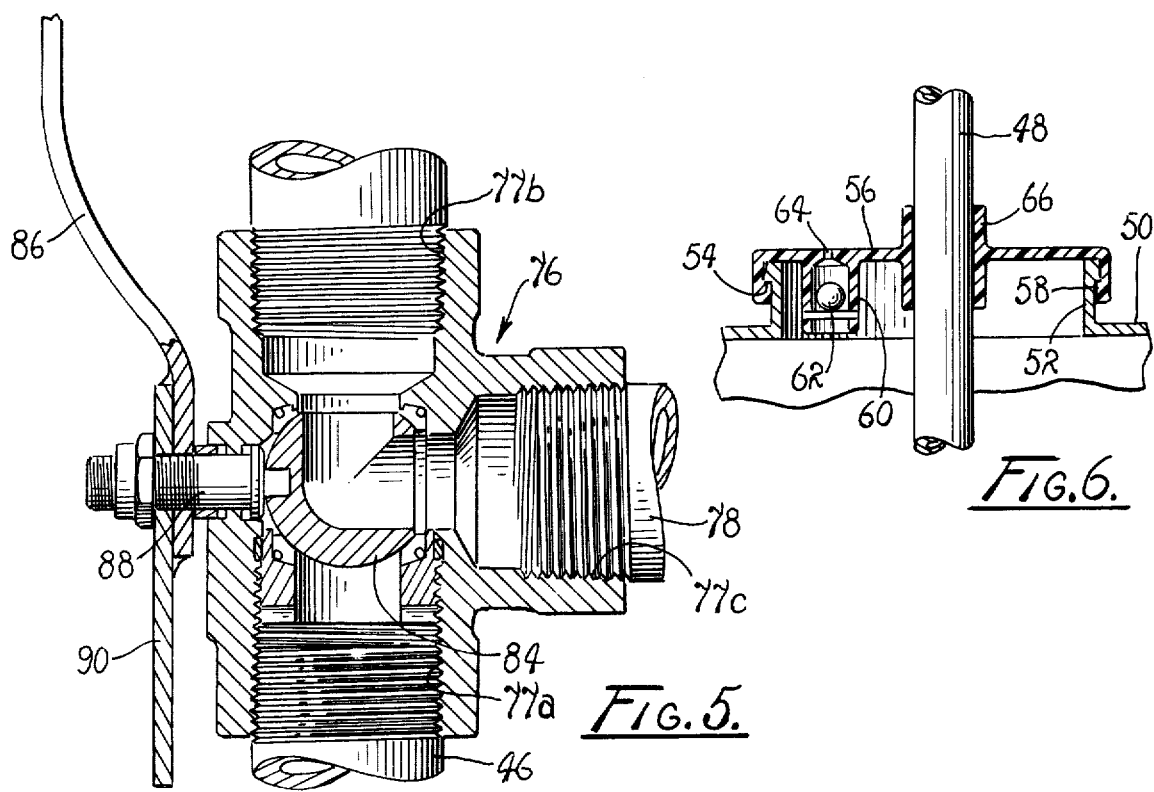

FLUID MEASURING CIRCUIT

BACKGROUND OF THE INVENTION

The invention relates to liquid measuring circuits, and more particularly to a substantially sealed liquid measuring circuit for delivering measured quantities of toxic liquids to a transfer circuit connected within a mixing system particularly suited for use in agricultural endeavors in diluting toxic liquids with predetermined quantities of water.

As can readily be appreciated by those familiar with techniques currently employed in the field of agriculture in combating insects, diseases, and unwanted plant growth, it is common practice to apply to selected areas large quantities of toxic, liquid chemicals utilizing water as a vehicle. Such application is achieved by mounting spray equipment, commonly referred to as spray-rigs, aboard a selected transport vehicle, such as an aircraft, a tractor or the like, which subsequently is employed in traversing selected surface areas while a fine mist or spray is ejected from the spray rig.

In the field of agriculture large acreages must be treated with suitably diluted toxic liquids during selected operations for effectively destroying unwanted plants, insects and the like. It is impractical, for reasons believed to be apparent, to transport large quantities of diluted toxic liquids to or near the situs of use. Therefore, the toxic liquid is transported in its concentrated form to the situs of use and thereafter diluted to a suitable strength employing water there made available.

The use of mixing systems for mixing toxic liquids with water, in order to provide a diluted toxic liquid preparatory to application, often requires the use of a mixing tank. Such systems often are characterized by a liquid transfer circuit which serves to extract quantities of water from the mixing tank, at a first location, and for thereafter reintroducing the water into the tank at another location, whereby a mixing of the toxic liquid with the water is achieved. Frequently, a recirculating pump is coupled within the transfer circuit with the low pressure side thereof being in communication with the tank at the first location, while the high pressure or discharge side of the pump is in communication with the tank at the other location. A high-volume, low-pressure, vane-type pump often is employed in maintaining a flow of liquid through the transfer circuit.

The toxic liquids employed normally are provided in point-of-sale containers such as glass bottles, steel drums and the like. These containers include throats, bungs and the like, which can be readily opened at the situs of use discharged into mixing tanks through suitable openings provided therein. Of course, such a practice tends to subject operators, frequently called chemical handlers, to contamination due to spillage of the concentrated toxic liquids on the clothing and skin, as well as through an inhalation of the chemical in its gaseous state. Such contamination is considered to be injurious to the health and well being of the operator and has been the subject of much controversy among growers, equipment operators, farm laborers, and the like.

It is therefore the purpose of the instant invention to provide a liquid measuring circuit for introducing into a transfer circuit connected with a mixing tank selected quantities of toxic liquid without subjecting operators to contamination through accidental contact with the liquid.

OBJECTS AND SUMMARY OF THE INVENTION

It is therefore an object of the instant invention to provide a liquid measuring circuit for use in introducing toxic liquids into mixing tanks, without subjecting operators to contamination through contact with the liquids.

It is another object to provide a fluid measuring circuit for measuring and dispensing toxic liquids including a holding tank adapted to confine a body of toxic liquid under predetermined pressure, and a selectively operable valve means for introducing a predetermined quantity of toxic liquid into the holding tank and thereafter discharging the liquid into a transfer circuit connected with a mixing tank.

It is another object to provide in a mixing system of a type including a mixing tank adapted to confine a quantity of toxic liquid and a transfer circuit for simultaneously extracting liquid from a first portion of the mixing tank and thereafter reintroducing the extracted liquid into a second portion of the mixing tank, a liquid measuring circuit which is simple and safe to operate, economic to fabricate, and practical to employ for use in safely introducing toxic liquids into mixing tanks preparatory to diluting the toxic liquid with water.

These and other objects and advantages are achieved through the use of a unique liquid measuring circuit in combination with a mixing system which includes a mixing tank adapted to confine a predetermined quantity of selected liquid and a transfer circuit for simultaneously extracting liquid from a first portion of the mixing tank and thereafter reintroducing the extracted liquid into a second portion of the tank. The measuring circuit includes a holding tank for receiving a body of toxic liquid, a liquid conduit having one end connected in communication with the holding tank and the opposite end thereof connected in communication with the transfer circuit, and a flexible tubular member having one end connected in communication with the holding tank while the opposite end portion thereof is adapted to be extended through a substantially sealed opening provided in a portable container confining a body of toxic liquid under ambient pressure, and a selectively operable three-way valve connected within the liquid conduit for selectively drawing a measured quantity of toxic liquid into the holding tank and thereafter discharging the toxic liquid to the transfer circuit, as will hereinafter become more fully apparent upon reference to the following description and claims in light of the accompanying drawings.

BRIEF DESCRIPTION OF THE DRAWINGS

FIG. 3 is an enlarged, fragmentary view of the selector valve shown in FIGS. 1 and 2.

FIG. 4 is a fragmentary view, similar to FIG. 3, but rotated through 90°.

FIG. 5 is a cross-sectional view of the selector valve.

FIG. 6 is a fragmented view depicting a cover employed in achieving a liquid-tight seal as a point-of-sale container is connected with the holding tank.

DESCRIPTION OF THE PREFERRED EMBODIMENT

Figure 1:
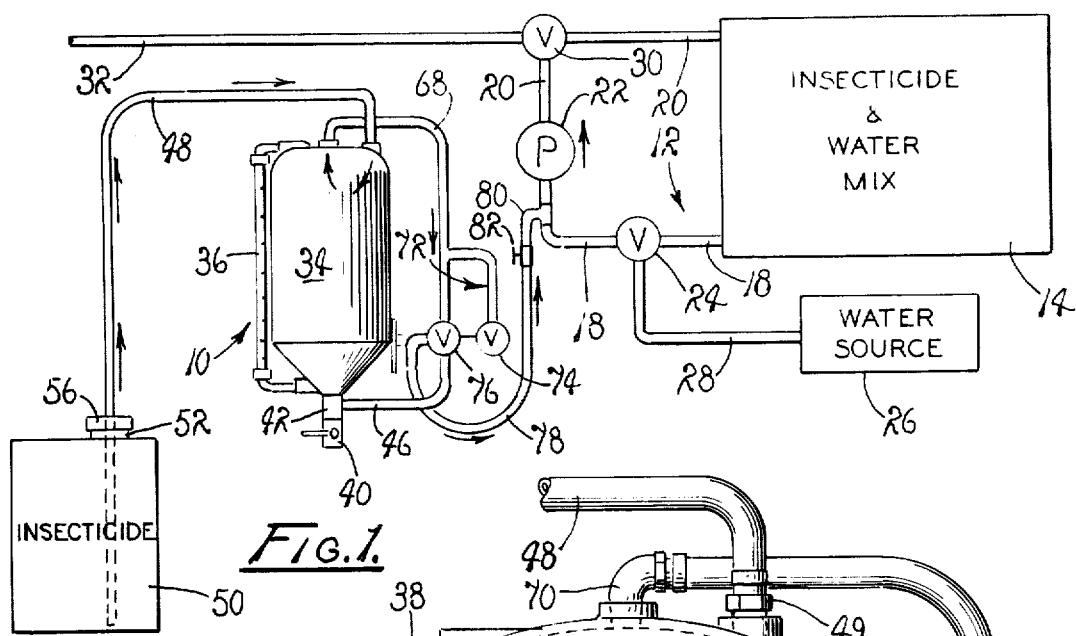
FIG. 1 is a schematic view depicting a mixing system including a liquid measuring circuit having a holding tank connected through a three-way valve with a liquid transfer circuit for a mixing tank, and further connected with a point-of-sale container for a concentrated toxic liquid.

Referring now with more specificity to the drawings, wherein like reference characters designate like or corresponding parts throughout the several views, there is shown in FIG. 1 a mixing system, including a measuring circuit for toxic liquids, which embodies the principles of the instant invention. The system, as shown, particularly is suited for use in diluting concentrated toxic insecticides preparatory to the delivery thereof to so-called spray-rigs currently employed in performing spraying operations in the agricultural industry. However, it is to be clearly understood that the utility of the system is not limited to dilution of insecticides and it can be readily employed in mixing liquids suited for numerous other purposes.

As illustrated in FIG. 1, the mixing system includes a liquid measuring circuit, generally designated 10, connected with a transfer circuit, generally designated 12. A mixing tank 14 is connected with the transfer circuit 12 in a manner such that the circuit 12 serves to draw liquid from the tank, at one location, and reintroduce the liquid into the tank at another location for purposes of recirculating the liquid contained within the tank, whereby a thorough mixing is achieved.

In order to achieve this function, the transfer circuit 12 includes a liquid extraction conduit 18 connected with the tank 14, near the bottom thereof, and a filling conduit 20 connected with the tank 14 near the uppermost portion thereof. The conduits 18 and 20 communicate through a pump 22 of any suitable design. In practice, a vane-type pump having high-quantity, low-pressure characteristics serves quite satisfactorily for this purpose. As a practical matter, the pump 22 is connected at its so-called low-pressure side with the conduit 18 and at its high-pressure side with the conduit 20. Thus, the pump 22 is suitably positioned for establishing a flow of liquid through the transfer circuit 12.

Within the conduit 18 there is connected a selector valve 24 which is further connected with a source of water 26 through a conduit 28. It will be appreciated that by manipulating the selector valve 24 water is introduced from the source 26 into the mixing tank 14, via the conduits 18 and 20. Similarly, within the conduit 20 there is connected a selector valve 30 which is further connected with a liquid delivery conduit 32 through which suitably diluted toxic liquid is delivered from the mixing system to spray-rigs.

It will therefore be appreciated that the water delivered to the tank 14 from the source 26 is employed for diluting concentrated toxic liquids mixed therewith simply by drawing the liquid from the bottom portion of the tank, through the conduit 18 and reintroducing the liquid into the tank through the conduit 20, as the pump 22 is operated.

Figure 2:
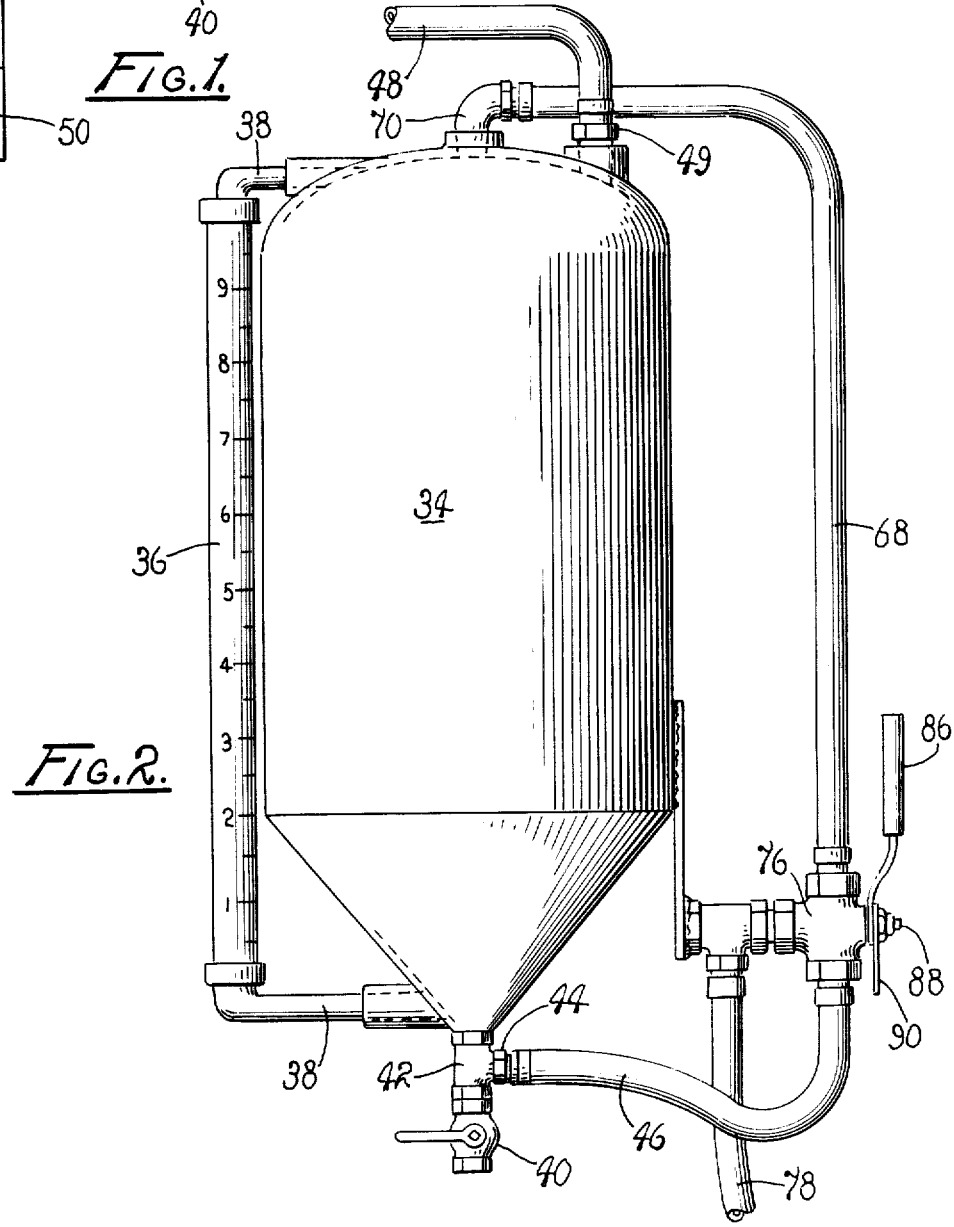
FIG. 2 is an elevational view of the holding tank shown in FIG. 1.

Turning now to FIG. 2, the liquid measuring circuit 10 includes a holding tank 34 particularly suited to function as a reservoir for concentrated toxic liquids. In practice, the holding tank 34 is an hermetically sealed steel vessel adapted to confine therewithin liquid under both negative as well as atmospheric pressures. The term negative pressure, as herein employed, designates any pressures below ambient atmospheric pressure. Moreover, it is to be understood that the tank 34 is suitably lined with materials substantially compatible with the toxic liquids confined therewithin.

The particular configuration of the tank 34 is dictated, at least in part, by convenience. However, a sight gauge 36 is connected with the tank for purposes of providing an indication of the level of the body of toxic liquid confined within the tank 34. Hence, it is necessary that the tank be so configured that the sight gauge 36 provide an accurate indication of the volume of the contents of the tanks. Additionally, it is desirable to configure the lowermost portions of the tank to conform to an inverted frusto-conical configuration for facilitating a complete extraction of the contents of the tank.

Since sight gauges are well known, a detailed description of the sight gauge 36 is omitted in the interest of brevity. However, it is noted that the sight gauge 36 includes a cylindrical body, formed of a transparent material, communicating with the interior of the tank 34 through conduits 38 connected with the opposite ends thereof. The transparent body is provided with calibrations or other suitable indicia for indicating the quantity of liquid confined within the tank, preferably in terms of pints, quarts, gallons and the like.

In practice, it has been found desirable to provide a flush-valve 40 connected with the tank 34 at its lowermost end, through which liquid contents of the tank 34 are discharged for flushing and similar purposes. The valve 40 preferably is connected with the tank 34 through a coupling 42, of a T-shaped configuration, which includes a laterally extended fitting 44.

To the fitting 44 there is connected a discharge conduit 46 through which the liquid contents of the holding tank 34 are selectively discharged to the circuit 12 while the liquid contents are, in practice, delivered to the tank 34 through a flexible conduit 48 connected with the tank at its uppermost end portion by a suitable fitting 49.

The conduit 48, at the end thereof opposite the fitting 49, is configured to be inserted as a "stinger" into ports, bungs, filling spouts and the like normally provided in point-of-sale containers. As illustrated, in FIG. 6, the container 50 includes a neck 52 having an annular lip 54 for receiving a ported cover 56, particularly suited for effecting a fluid-tight seal between the container and the conduit 48. As shown, the cover 56 is formed of a resilient material and includes an annular lip 58 configured to mate with the lip 54. Within the cover 56 there is provided a bleeder valve 60 which accommodates entry of atmospheric pressure into the container 50, while serving to seal the container against a discharge of fluid. As shown, a ball-float 62 supported in coaxial alignment with a bleeder port 64 serves quite satisfactorily for this purpose.

The cover 56 is further provided with a concentric bore defined by a sleeve 66 extended axially through the cover and having an internal dimension suitable for achieving frictional engagement with the conduit 48 as it is extended therethrough. As a practical matter, the external surface of the conduit 48 and the internal surface of the sleeve 66 are mated in fluid-tight engagement.

It is to be understood that the cover 56, as hereinbefore described, is merely representative of a family of covers particularly suited for effecting a fluid-tight coupling of the container 50 with the holding tank 34. Therefore, both the design and the configuration of the cover 56 is, in practice, varied as desired for accommodating a fluid-tight coupling of the container 50 with the holding tank 34.

In order to establish a flow of toxic liquid from the container 50, through the conduit 48, into the tank 34 there is provided a vacuum conduit 68, connected with the tank 34 at a fitting 70. Through this conduit a negative pressure is introduced into the holding tank 34 whereby atmospheric pressure within the container 50 serves to force the liquid through the conduit toward the tank 34. Also connected with the vacuum conduit 68 there is a relief circuit, generally designated 72, which includes a conduit 73, FIG. 4, connected with the vacuum conduit 68 at a suitable fitting and terminating in a poppet valve 74 communicating with ambient atmosphere. Therefore, it should readily be apparent that it is possible to interrupt the flow of liquid into the tank 34 simply by relieving the negative pressure established therewithin through an operation of the poppet valve 74 of the relief circuit 72.

In practice, the discharge conduit 46 and the vacuum conduit 68 are commonly connected with a three-way selector valve 76 through ports 77a and 77b, respectively. The selector valve 76 is coupled with the pump 22 through a coupling conduit 78 connected with the selector valve at a port designated 77c. The opposite end of the conduit 78 is connected with the conduit 18 through a pipe nipple 80 tapped into the conduit 18 as close as possible to the intake or low-pressure side of the pump 22. Thus, through the conduit 78 the low-pressure side of the pump 22 is connected in communication with selector valve 76 for accommodating an introduction of negative pressure into the holding tank 34, or, alternatively, for drawing the contents from the holding tank via the discharge conduit.

A stop-cock valve 82 is provided in the conduit 78 immediately upstream from the pipe nipple 18. This cock is permanently adjusted to accommodate a maximum flow of fluid, without interrupting circulation of liquid through the circuit 12. It should, therefore, readily be apparent that the low-pressure side of the pump 22 is selectively placed in communication with the interior of the holding tank 34 through a suitable manipulation of the selector valve 76, hereinafter more fully described.

While the selector valve 76 is of any suitable configuration, a three-way, two-port ball, valve functions quite satisfactorily for this purpose. The selector valve 76, as illustrated, includes an internal valve selector ball 84 suitably ported to include a pair of communicating ports, not designated, for causing the port 77c to communicate with either of the ports 77a or 77b as the selector ball is rotated within the valve housing. Moreover, the selector ball is afforded a 180° turn, so that the selector ball may be advanced through 90° to a position midway between the extremeties of its throw for thus interrupting communication between the various ports formed within the valve housing.

In order to impart rotation to the selector ball, there is provided a handle 86 connected with the selector ball 84 through a pin 88, in a manner well understood by those familiar with such valves. In practice, it has been found convenient to interconnect the handle 86 and the selector ball 84 in a manner such that the handle 86 is projected upwardly when the ball 84 is so positioned to cause the ports 77c and 77b to be placed in communication, to be horizontally projected when the ball 84 is so positioned that communication between the ports is interrupted, and to be projected downwardly when the ports 77a and 77c are placed in communication. Therefore, it should be apparent that an operator can readily determine the mode of the mixing system simply by observing the position of the handle 86.

In order to achieve an immediate termination of the flow of toxic liquid from the container 50 into the tank 34, once the handle 86 has been horizontally projected, it is desirable to relieve the negative pressure established with the holding tank. Therefore, a valve-actuating cam plate 90 is rigidly fixed to the handle 86 adjacent to the stem 88 in a plane such that the plate engages a spring-loaded stem 92 projected from poppet valve 74 as angular displacement is imparted to the handle 86 for repositioning the handle to a horizontal projection. The radius and the angular length of the plate 90 is such that the plate further serves to maintain the stem 92 in a depressed condition as the handle 86 is advanced from a horizontally projected disposition to its downwardly directed disposition. Thus, the atmospheric pressure is introduced into the interior of the holding tank 34 in each position of the valve, excepting that in which the pump 22 is caused to communicate with the interior of the holding tank 34 through the vacuum conduit 68.

OPERATION

It is believed that in view of the foregoing description, the operation of the device will readily be understood and it will be briefly reviewed at this point.

With the mixing system assembled in the manner hereinbefore described, precise quantities of concentrated toxic liquids readily can be introduced into the mixing system and properly diluted preparatory to being transferred to spray-rigs and the like, without subjecting operators to contamination through contact with the toxic liquid.

In order to achieve this result the tank 14 first is filled by introducing a predetermined quantity of water from the source 26 into the transfer circuit 12 through the valve 24. A point-of-sale container 50 then is positioned in close proximity with the holding tank 34 and the throat thereof opened. The cover 56 now is placed over the neck 52 of the container 50, as illustrated in FIG. 6. Thereupon, the conduit 48 is inserted through the sleeve 66 into the container with a fluid-tight seal being established between the adjacent surfaces.

Figure 7A:
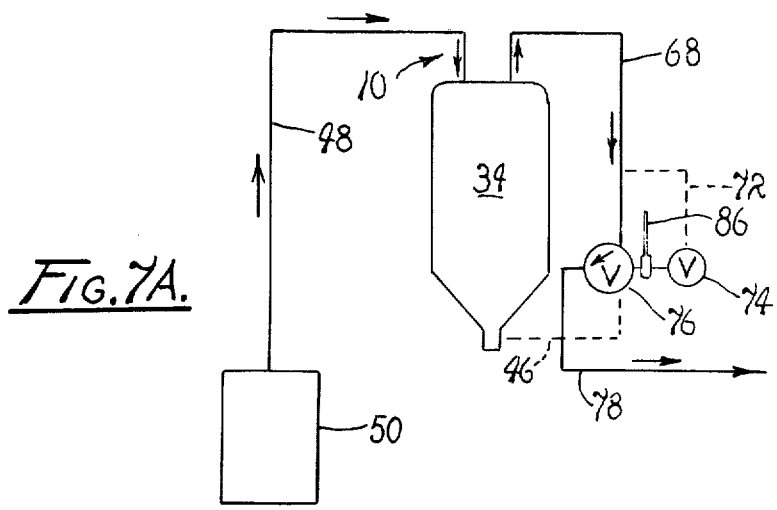
FIGS. 7A, 7B, and 7C collectively depict a cycle of operation for the liquid measuring circuit shown in FIG. 1.
Figure 7B:
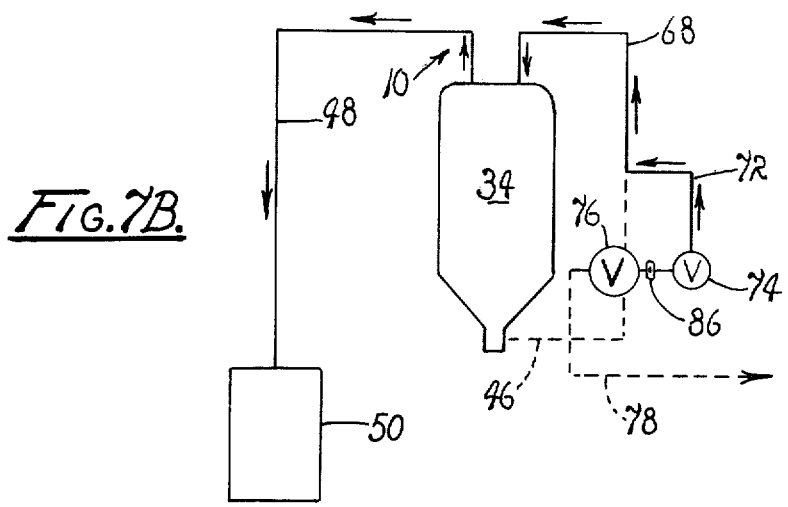
Figure 7C:
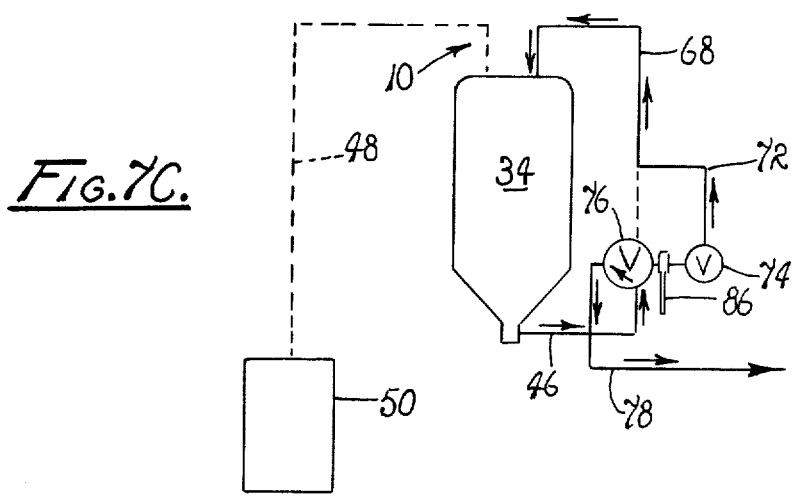

With the handle 86 projected upwardly, as illustrated in FIG. 7A, the pump 22 is caused to communicate with the conduit 68 through the valve 76 for thereby introducing a negative pressure into the interior of the holding tank 34. Thus, a flow of toxic liquid is established, through the conduit 48, from the container 50 to the holding tank 34. Once a suitable quantity of toxic liquid has been delivered from the container 50, as indicated by the sight gauge 36, the operator repositions the handle 86 to a horizontally projected position, FIG. 7B, whereupon the stem 92 of the valve 74 is depressed by the plate 90 so that atmospheric pressure is introduced into the holding tank 34 for thereby relieving the negative pressure previously established therein. The flow of toxic liquid from the container 50 thus is interrupted with the liquid contained within the conduit 48 being released and permitted to flow under gravity back to the container 50. The handle 86 next is repositioned to project downwardly, FIG. 7C, whereupon the selector ball 84 is repositioned for causing the ports 77a and 77c to be placed in communication. Thus the low-pressure side of the pump 22 is caused to communicate with the interior of the holding tank 34 through the discharge conduit 46. The toxic liquid previously delivered to the tank 34 now is discharged to the circuit 12 via the conduit 46, the valve 76, and the conduit 78, all without subjecting the operator to contamination through contact with the toxic liquid.

As the transfer circuit 12 recirculates the contents of the mixing tank 14, the toxic liquid delivered thereto from the holding tank 34 is thoroughly mixed with the water confined within the tank so that a proper dilution is achieved, preparatory to the delivery thereof to spray-rigs coupled with the system through the conduit 32.

It should therefore be apparent that through the instant invention there has been provided a practical solution to the perplexing problem of providing a suitable system wherein concentrated toxic liquids can be diluted for use with spray-rigs without subjecting operators to hazards of contamination resulting from an accidental spillage and inhalation of toxic fumes.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A substantially sealed, manually operable liquid measuring circuit particularly adapted to be connected with a liquid transfer circuit and employed for delivering thereto measured quantities of toxic liquids comprising:
   A. valve means including,
      1. a valve housing having means defining therein a first port, a second port disposed in spaced relation with said first port, and a third port disposed in spaced relation with said first and second ports,
      2. valve selector means movably seated within said housing and repositionable from a first position, wherein said selector means serves to connect said first port in communication with said second port, to a second position, wherein said selector means serves to interrupt communication between said first and second port, and thence to a third position, wherein said selector means serves to connect said first port in communication with said third port, and
      3. manually operable valve actuating means including a manually displaceable, pivotally supported handle projected from said valve housing and connected with said valve selector means for selectively repositioning said valve selector means from said first position to said second position, and thence to said third position;
   B. means for continuously applying a vacuum to said valve means including a first conduit connected in communication with said first port and adapted to be connected with the low-pressure side of a liquid transfer pump of a liquid transfer circuit;
   C. a holding tank adapted to receive and confine therein a measurable quantity of liquid;
   D. means for delivering a quantity of liquid to the holding tank including,
      1. a tubular member having a first end portion connected in communication with the holding tank and a second end portion adapted to be connected in communication with a container confining therewithin a quantity of liquid maintained under ambient atmospheric pressure, and
      2. a second conduit connected between said holding tank and said second port through which said second port communicates with said holding tank for evacuating the interior of said holding tank when said first and second ports are connected in communication;
   E. liquid discharge means including,
      1. a third conduit connected between said holding tank and said third port through which said third port communicates with said holding tank for discharging a measured quantity of liquid from said holding tank to said first conduit when said first and third ports are connected in communication, and
      2. means including a pressure relief circuit connected with said holding tank for introducing atmospheric pressure into said holding tank in response to a repositioning of said valve selector means to said third position; and
   F. means including a sight-gauge mounted on said holding tank for continuously indicating the quantity of liquid confined therein.

* * * * *